(12) United States Patent
An et al.

(10) Patent No.: US 10,432,602 B2
(45) Date of Patent: Oct. 1, 2019

(54) ELECTRONIC DEVICE FOR PERFORMING PERSONAL AUTHENTICATION AND METHOD THEREOF

(71) Applicant: Samsung Electronics Co., Ltd., Suwon-si, Gyeonggi-do (KR)

(72) Inventors: Tae In An, Hwaseong-si (KR); Yang Soo Lee, Yongin-si (KR); Moon Soo Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 15/165,380

(22) Filed: May 26, 2016

(65) Prior Publication Data

US 2016/0359833 A1   Dec. 8, 2016

(30) Foreign Application Priority Data

Jun. 4, 2015   (KR) .................. 10-2015-0079205

(51) Int. Cl.
| | |
|---|---|
| *H04L 29/06* | (2006.01) |
| *G06F 21/32* | (2013.01) |
| *G06K 9/46* | (2006.01) |
| *G06K 9/62* | (2006.01) |
| *G06K 9/00* | (2006.01) |
| *G06K 9/22* | (2006.01) |

(52) U.S. Cl.
CPC .............. *H04L 63/08* (2013.01); *G06F 21/32* (2013.01); *G06K 9/00006* (2013.01); *G06K 9/00597* (2013.01); *G06K 9/00912* (2013.01); *G06K 9/22* (2013.01); *G06K 9/46* (2013.01); *G06K 9/6202* (2013.01); *H04L 63/10* (2013.01)

(58) Field of Classification Search
CPC ......... H04L 63/08; H04L 63/10; G06F 21/32; G06K 9/00006; G06K 9/00597; G06K 9/00912; G06K 9/22; G06K 9/46; G06K 9/6202
See application file for complete search history.

(56) References Cited

U.S. PATENT DOCUMENTS

| 9,342,677 B2 | 5/2016 | Ali et al. |
| 9,888,171 B2 * | 2/2018 | Chou ................. H04N 5/23219 |
| 2005/0071647 A1 | 3/2005 | Fujinuma et al. |

(Continued)

FOREIGN PATENT DOCUMENTS

| CN | 1717703 A | 1/2006 |
| CN | 101079106 A | 11/2007 |

(Continued)

OTHER PUBLICATIONS

Chinese Office Action dated Mar. 14, 2019, issued in Chinese Patent Application No. 201610392393.4.

(Continued)

*Primary Examiner* — Sher A Khan
(74) *Attorney, Agent, or Firm* — Jefferson IP Law, LLP

(57) ABSTRACT

An electronic device is provided. The electronic device includes a sensing circuit and a processor. The processor is configured to captures a plurality of authentication images through the sensing circuit during a specific time, select at least one first image from the authentication images, and perform an authentication based on the at least one first image.

18 Claims, 11 Drawing Sheets

(56) References Cited

U.S. PATENT DOCUMENTS

| | | | |
|---|---|---|---|
| 2006/0029262 A1* | 2/2006 | Fujimatsu | G06K 9/00604 382/117 |
| 2008/0127330 A1* | 5/2008 | Seo | H04N 21/43615 726/20 |
| 2009/0140838 A1* | 6/2009 | Newman | G06Q 20/40 340/5.83 |
| 2012/0062720 A1 | 3/2012 | Choi et al. | |
| 2012/0123920 A1* | 5/2012 | Fraser | G06F 21/36 705/34 |
| 2012/0230555 A1* | 9/2012 | Miura | G06K 9/00087 382/124 |
| 2012/0320181 A1* | 12/2012 | Hong | G06K 9/00281 348/78 |
| 2013/0133055 A1 | 5/2013 | Ali et al. | |
| 2013/0162799 A1* | 6/2013 | Hanna | A61B 5/117 348/78 |
| 2013/0208167 A1* | 8/2013 | Chou | H04N 5/23219 348/333.11 |
| 2014/0105449 A1* | 4/2014 | Caton | G06F 21/34 382/100 |
| 2014/0130148 A1* | 5/2014 | Sako | G06F 21/36 726/19 |
| 2014/0197922 A1* | 7/2014 | Stanwood | G06F 21/32 340/5.83 |
| 2014/0286528 A1* | 9/2014 | Endoh | G06K 9/00067 382/103 |
| 2014/0341441 A1 | 11/2014 | Slaby et al. | |
| 2015/0074418 A1* | 3/2015 | Lee | G06F 21/45 713/186 |
| 2015/0269452 A1 | 9/2015 | Vardy | |
| 2016/0293138 A1 | 10/2016 | Zhang | |
| 2017/0091550 A1* | 3/2017 | Feng | G06K 9/00617 |
| 2018/0107814 A1* | 4/2018 | Wu | G02B 27/017 |

FOREIGN PATENT DOCUMENTS

| | | |
|---|---|---|
| CN | 101408938 A | 4/2009 |
| CN | 101493884 A | 7/2009 |
| CN | 101620675 A | 1/2010 |
| CN | 101894257 A | 11/2010 |
| CN | 102298692 A | 12/2011 |
| CN | 103049888 A | 4/2013 |
| CN | 103489160 A | 1/2014 |
| CN | 103646203 A | 3/2014 |
| CN | 104021382 A | 9/2014 |
| CN | 104299196 A | 1/2015 |
| EP | 2 381 390 A2 | 10/2011 |
| KR | 10-2011-0134999 A | 12/2011 |
| KR | 10-2012-0035964 A | 4/2012 |
| WO | 2014056032 A1 | 4/2014 |

OTHER PUBLICATIONS

European Office Action dated Jun. 13, 2019, issued in European Patent Application No. 16172874.6.
Chinese Office Action dated Jul. 25, 2019 , issued in Chinese Patent Application No. 201610392393.4.

* cited by examiner

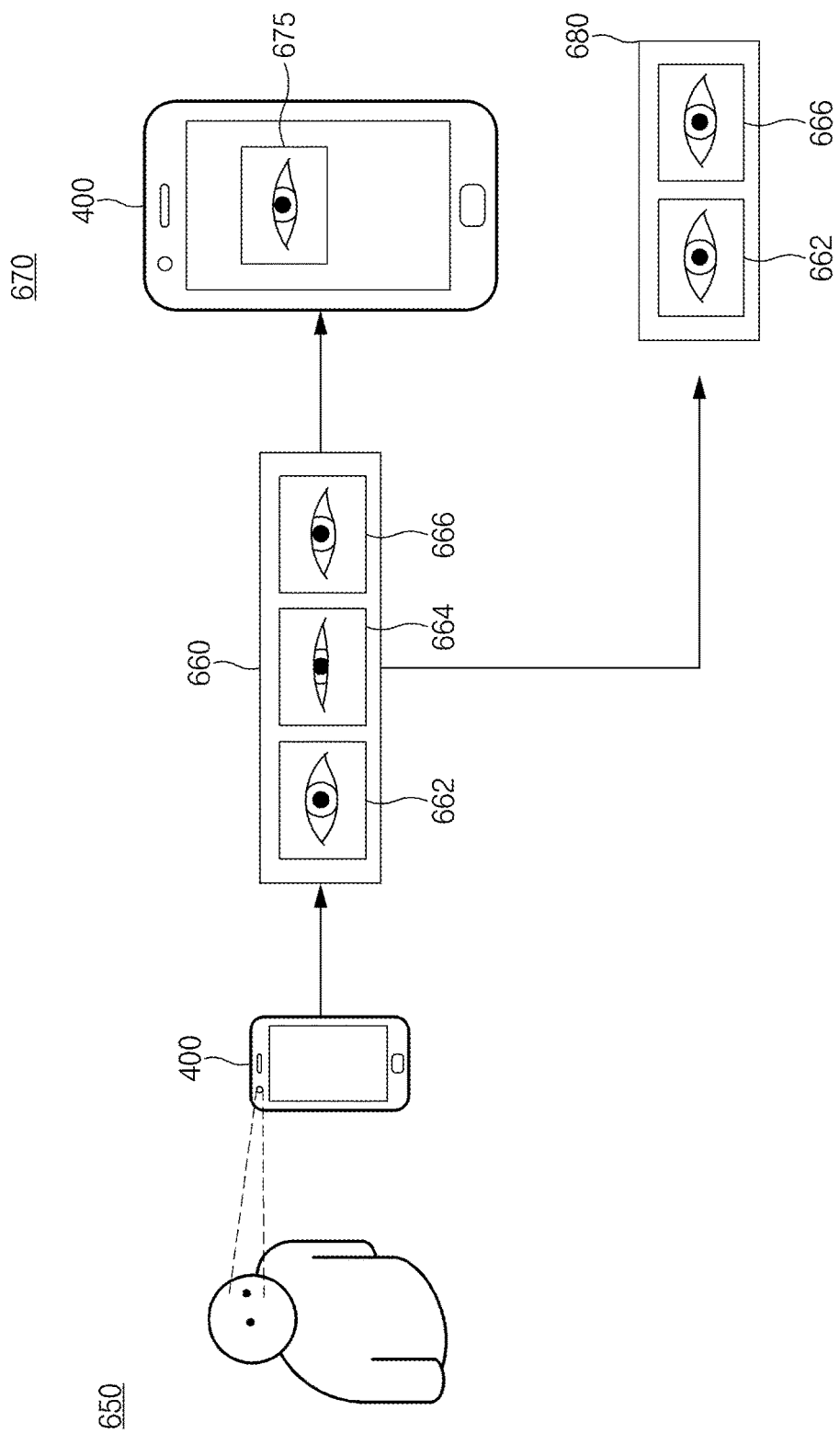

ELECTRONIC DEVICE FOR PERFORMING PERSONAL AUTHENTICATION AND METHOD THEREOF

CROSS-REFERENCE TO RELATED APPLICATION(S)

This application claims the benefit under 35 U.S.C. § 119(a) of a Korean patent application filed on Jun. 4, 2015 in the Korean Intellectual Property Office and assigned Serial number 10-2015-0079205, the entire disclosure of which is hereby incorporated by reference.

TECHNICAL FIELD

The present disclosure relates to an electronic device for performing personal authentication and a method thereof.

BACKGROUND

With developments of information and communication technology, an electronic device transmits and receives data to and from another electronic device through a network, and thus a user utilizes the network freely anywhere in the country.

According to the recent trend of the digital convergence, electronic devices provide a variety of functions. For example, a smartphone supports an internet connection function and a call function. Furthermore, the smartphone supports playing music or video, capturing video, photo, and the like using an image sensor, and the like.

Since the user generally carries the electronic device, the user stores personal information in the electronic device. Accordingly, the electronic device performs personal authentication such that other people cannot access the user's personal information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that performs personal authentication and a method thereof.

In accordance with an aspect of the present disclosure, an electronic device is provided. The electronic device includes a sensing circuit and a processor electrically connected with the sensing circuit. The processor captures a plurality of authentication images through the sensing circuit during a specific time, selects at least one first image from the authentication images, and performs an authentication based on the at least one first image.

In accordance with another aspect of the present disclosure, a method performed on an electronic device is provided. The method includes capturing a plurality of authentication images through a sensing circuit during a specific time and selecting at least one first image from the authentication images and performing an authentication based on the at least one first image.

In accordance with another aspect of the present disclosure, a computer-readable recording medium recorded with an instruction, the instruction, when executed by at least one processor, causing the at least one processor to perform a method is provided. The recording medium incudes capturing a plurality of authentication images through a sensing circuit during a specific time and selecting at least one first image from the authentication images and performing an authentication based on the at least one first image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6B is a diagram illustrating selection of an effective image in the electronic device according to various embodiments of the present disclosure;

Throughout the drawings, it should be noted that like reference numbers are used to depict the same or similar elements, features, and structures.

DETAILED DESCRIPTION

Figure 1:
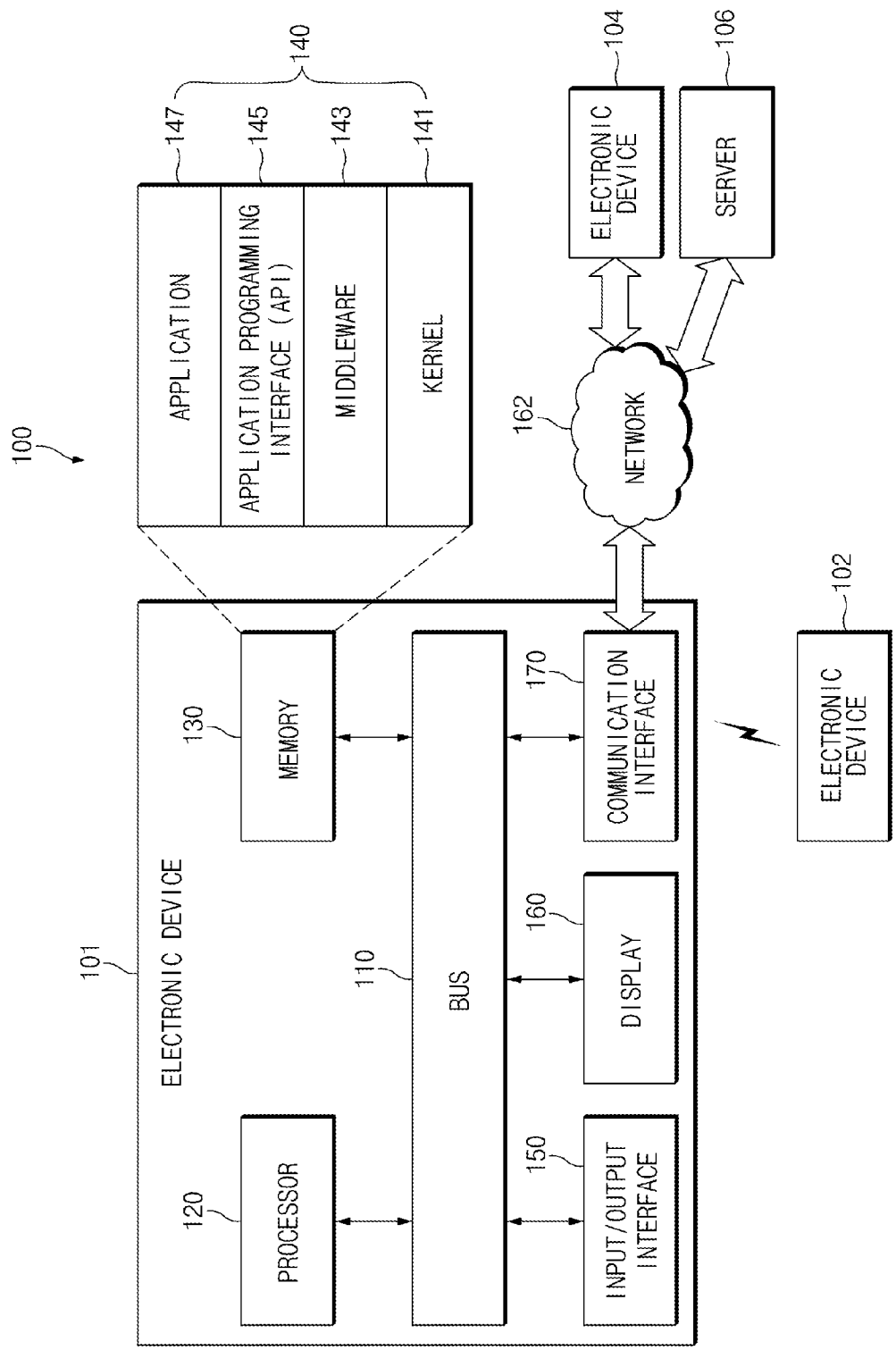
FIG. 1 is a diagram illustrating an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As referred to herein, the expressions "have", "may have", "include", "comprise", "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to when at least one A is included, when at least one B is included, or when both of at least one A and at least one B are included.

Numeric terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. A central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal definition unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group phase 1 or phase 2 (MPEG-1 or MPEG-2) audio layer 3 (MP3) players, mobile medical devices, cameras, or wearable devices. According to various embodiments, a wearable device may include at least one of an accessory type (e.g., a watch, a ring, a bracelet, an ankle bracelet, a necklace, glasses, contact lens, or a head-mounted-device (HMD)), a fabric or clothing (e.g., electronic apparel), a physical attachment type (e.g., a skin pad or a tattoo), or a body implantation type (e.g., an implantable circuit).

According to an embodiment, the electronic device may be a home appliance. The smart home appliances may include at least one of, for example, televisions (TVs), digital versatile disc (DVD) players, audio players, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to another embodiment, the electronic devices may include at least one of medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, an electronic device according to various embodiments will be described with reference to the accompanying drawings. The term "user" used herein may refer to a person who uses an electronic device or may refer to a device (e.g., an artificial electronic device) that uses an electronic device.

In the following drawings, various embodiments of the present disclosure will be exemplified as the electronic device is a smartphone.

FIG. 1 is a diagram illustrating an electronic device in a network environment, according to various embodiments of the present disclosure.

Referring to FIG. 1, an electronic device 101 transmits and receives information in a network environment 100. The electronic device 101 may include a bus 110, a processor 120, a memory 130, an input/output interface 150, a display 160, and a communication interface 170. According to an embodiment, the electronic device 101 may not include at least one of the above-described elements or may further include other element(s).

The bus 110 may interconnect the above-described elements 110 to 170 and may be a circuit for conveying communications (e.g., a control message and/or data) among the above-described elements.

The processor 120 may include one or more of a CPU, an AP, or a communication processor (CP). For example, the processor 120 may perform an arithmetic operation or data processing associated with control and/or communication of at least other elements of the electronic device 101.

The memory 130 may include a volatile and/or nonvolatile memory. The memory 130 may store instructions or data associated with at least one other component of the electronic device 101. According to an embodiment, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be called an operating system (OS).

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform a mediation role such that the API 145 or the application program 147 communicates with the kernel 141 to exchange data.

Furthermore, the middleware 143 may process task requests received from the application program 147 according to a priority. For example, the middleware 143 may assign a priority to at least one of the application program 147, which makes it possible to use a system resource (e.g., the bus 110, the processor 120, the memory 130, or the like) of the electronic device 101. For example, the middleware 143 may process the one or more task requests according to the assigned priority, which makes it possible to perform scheduling or load balancing on the one or more task requests.

The API 145 may be an interface through which the application program 147 controls a function provided by the kernel 141 or the middleware 143, and may include, for example, at least one interface or function (e.g., an instruction) for a file control, a window control, image processing, a character control, or the like.

The input/output (I/O) interface 150 may transmit an instruction or data, input from a user or another external device, to other element(s) of the electronic device 101. Furthermore, the I/O interface 150 may output an instruction or data, received from other element(s) of the electronic device 101, to a user or another external device.

The display 160 may include, for example, a liquid crystal display (LCD), a light-emitting diode (LED) display, an organic LED (OLED) display, or a microelectromechanical systems (MEMS) display, or an electronic paper display. The display 160 may display, for example, various content (e.g., a text, an image, a video, an icon, a symbol, and the like) to a user. The display 160 may include a touch screen and may receive, for example, a touch, gesture, proximity, or hovering input using an electronic pen or a portion of a user's body.

The communication interface 170 may establish communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may include at least one of, for example, long-term evolution (LTE), LTE-advanced (LTE-A), code division multiple access (CDMA), WCDMA (wideband CDMA), universal mobile telecommunications system (UMTS), wireless broadband (WiBro), or global system for mobile communications (GSM), or the like, as cellular communication protocol. Furthermore, the wireless communication may include, for example, a local area network 164. The local area network 164 may include at least one of Wi-Fi, near field communication (NFC), or a GNSS, or the like. The GNSS may include at least one of, for example, a global positioning system (GPS), a Glonass, a beidou navigation satellite system (hereinafter referred to as "Beidou"), or a European global satellite-based navigation system (hereinafter referred to as "Galileo") based on an available region, a bandwidth, or the like. Hereinafter "GPS" and "GNSS" may be used interchangeably in this disclosure. The wired communication may include at least one of, for example, a universal serial bus (USB), a high definition multimedia interface (HDMI), a recommended standard-232 (RS-232), or a plain old telephone service (POTS). The network 162 may include at least one of telecommunications networks, for example, a computer network (e.g., local area network (LAN) or wide area network (WAN)), an Internet, or a telephone network.

Each of the first external electronic device 102 and the second external electronic device 104 may be a device of which the type is different from or the same as that of the electronic device 101. According to an embodiment, the server 106 may include a group of one or more servers. According to various embodiments, all or a part of operations that the electronic device 101 performs may be executed by another or plural electronic devices (e.g., the first and second external electronic devices 102 and 104 and the server 106). According to an embodiment, when the electronic device 101 executes any function or service automatically or in response to a request, the electronic device 101 may, alternatively or additionally, request at least a portion of a function from another device (e.g., the first external electronic device 102, the second external electronic device 104, or the server 106). Another electronic device (e.g., the first external electronic device 102, the second external electronic device 104, or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
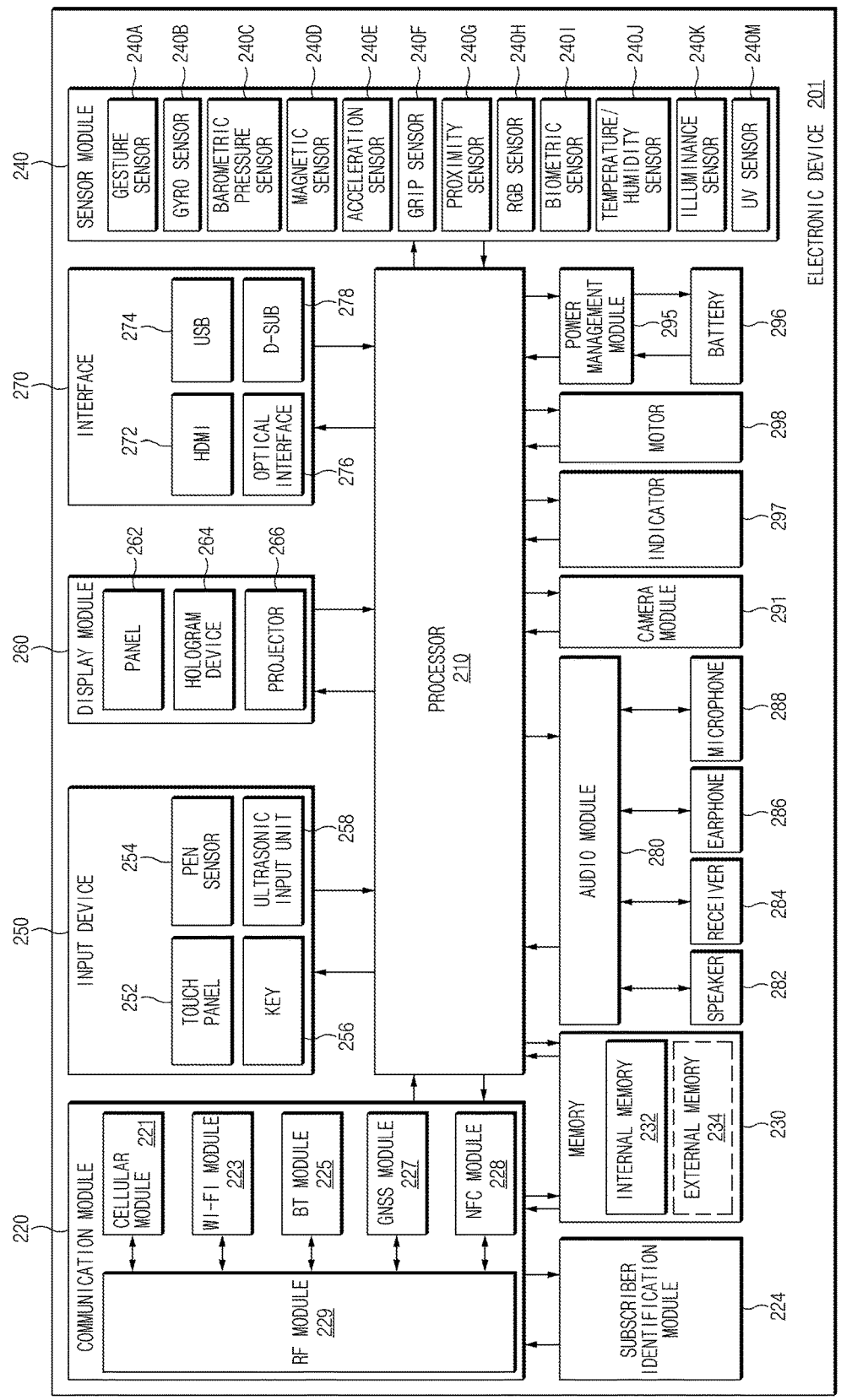
FIG. 2 is a block diagram of an electronic device according to various embodiments of the present disclosure.

FIG. 2 is a block diagram of an electronic device according to various embodiments of the present disclosure.

Referring to FIG. 2, an electronic device 201 may include, for example, all or a part of an electronic device 101 illustrated in FIG. 1. The electronic device 201 may include one or more processors (e.g., an AP) 210, a communication module 220, a subscriber identification module 224, a memory 230, a sensor module 240, an input device 250, a display module 260, an interface 270, an audio module 280, a camera module 291, a power management module 295, a battery 296, an indicator 297, and a motor 298.

The processor 210 may execute an OS or an application to control hardware or software elements connected to the processor 210 and may process and compute a variety of data. The processor 210 may be implemented, for example, with a system on chip (SoC). According to an embodiment, the processor 210 may further include a graphics processing unit (GPU) and/or an image signal processor (ISP). The processor 210 may include at least a part (e.g., a cellular module 221) of elements illustrated in FIG. 2. The processor 210 may load and process an instruction or data, which is received from at least one of other elements (e.g., a nonvolatile memory), to volatile memory and may store a variety of data in a nonvolatile memory.

The communication module 220 may be configured the same as or similar to the communication interface 170 of FIG. 1. The communication module 220 may include the cellular module 221, a Wi-Fi module 223, a Bluetooth (BT) module 225, a GNSS module 227, an NFC module 228, and a radio frequency (RF) module 229.

The cellular module 221 may provide, for example, voice communication, video communication, a message service, an Internet service or the like, through a communication network. The cellular module 221 may perform authentication of the electronic device 201 within a communication network using, for example, the subscriber identification module (SIM) card 224. According to an embodiment, the cellular module 221 may perform at least a portion of functions that the processor 210 provides. According to an embodiment, the cellular module 221 may include a CP.

Each of the Wi-Fi module 223, the BT module 225, the GNSS module 227, and the NFC module 228 may include, for example, a processor for processing data exchanged through a corresponding module. At least a portion (e.g., two or more) of the cellular module 221, the Wi-Fi module 223, the BT module 225, the GNSS module 227, and the NFC module 228 may be included within one integrated circuit (IC) or an IC package.

The RF module 229 may transmit and receive, for example, a communication signal (e.g., an RF signal). The RF module 229 may include a transceiver, a power amplifier module (PAM), a frequency filter, a low noise amplifier (LNA), an antenna, or the like. At least one of the cellular module 221, the Wi-Fi module 223, the BT module 225, the GNSS module 227, or the NFC module 228 may transmit and receive the RF signal through a separate RF module.

The SIM card 224 may include, for example, a card and/or an embedded SIM that includes a SIM and may include unique identification information (e.g., integrated circuit card identifier (ICCID)) or subscriber information (e.g., integrated mobile subscriber identity (IMSI)).

The memory 230 (e.g., the memory 130) may include at least one of an internal memory 232 and an external memory 234. For example, the internal memory 232 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically EPROM (EEPROM), a mask ROM, a flash ROM, a NAND flash memory, or a NOR flash memory), a hard drive, or a solid state drive (SSD).

The external memory 234 may further include a flash drive, for example, compact flash (CF), secure digital (SD), micro-SD, mini-SD, extreme digital (xD), multimedia card (MMC), a memory stick, or the like. The external memory 234 may be functionally and/or physically connected to the electronic device 201 through various interfaces.

The sensor module 240 may measure, for example, a physical quantity or may detect an operation state of the electronic device 201. The sensor module 240 may convert the measured or detected information to an electric signal. The sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature/humidity sensor 240J, an illuminance sensor 240K, or an ultraviolet (UV) sensor 240M. Even though not illustrated, additionally or alternatively, the sensor module 240 may further include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a supplemental processor which is a part of the processor 210 or independent of the processor 210 and is configured to control the sensor module 240. The supplemental processor may control the sensor module 240 while the processor 210 remains in a sleep state.

The input device 250 may include, for example, a touch panel 252, a (digital) pen sensor 254, a key 256, or an ultrasonic input unit 258. The touch panel 252 may use at least one of capacitive, resistive, infrared or ultrasonic method. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

The display module 260 (e.g., the display 160) may include a panel 262, a hologram device 264, or a projector 266. The panel 262 may be configured to be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen to display an image. The screen may be arranged, for example, inside or outside of the electronic device 201. According to an embodiment, the display module 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high definition link (MHL) interface, a SD card/MMC interface, or an IR data association (IrDA) standard interface.

The audio module 280 may convert a sound and an electric signal in dual directions. At least a portion of the audio module 280 may be included, for example, in an I/O interface 150 illustrated in FIG. 1. The audio module 280 may process, for example, sound information that is inputted or outputted through a speaker 282, a receiver 284, an earphone 286, or the microphone 288.

The camera module 291 is for acquiring a still image or a video and may include, for example, at least one or more image sensors (e.g., a front sensor or a rear sensor), a lens, an ISP, or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a portion thereof (e.g., the processor 210), such as a booting state, a message state, a charging state, or the like. The motor 298 may convert an electrical signal into a mechanical vibration and may generate a vibration, a haptic effect, or the like. Even though not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. The electronic device according to various embodiments may include at least one of the above-mentioned elements, and some elements may be omitted or other additional elements may be added. Further, some of the elements of the electronic device according to various embodiments may be combined with each other so as to form one entity, so that the functions of the elements may be performed in the same manner as before the combination.

Figure 3:
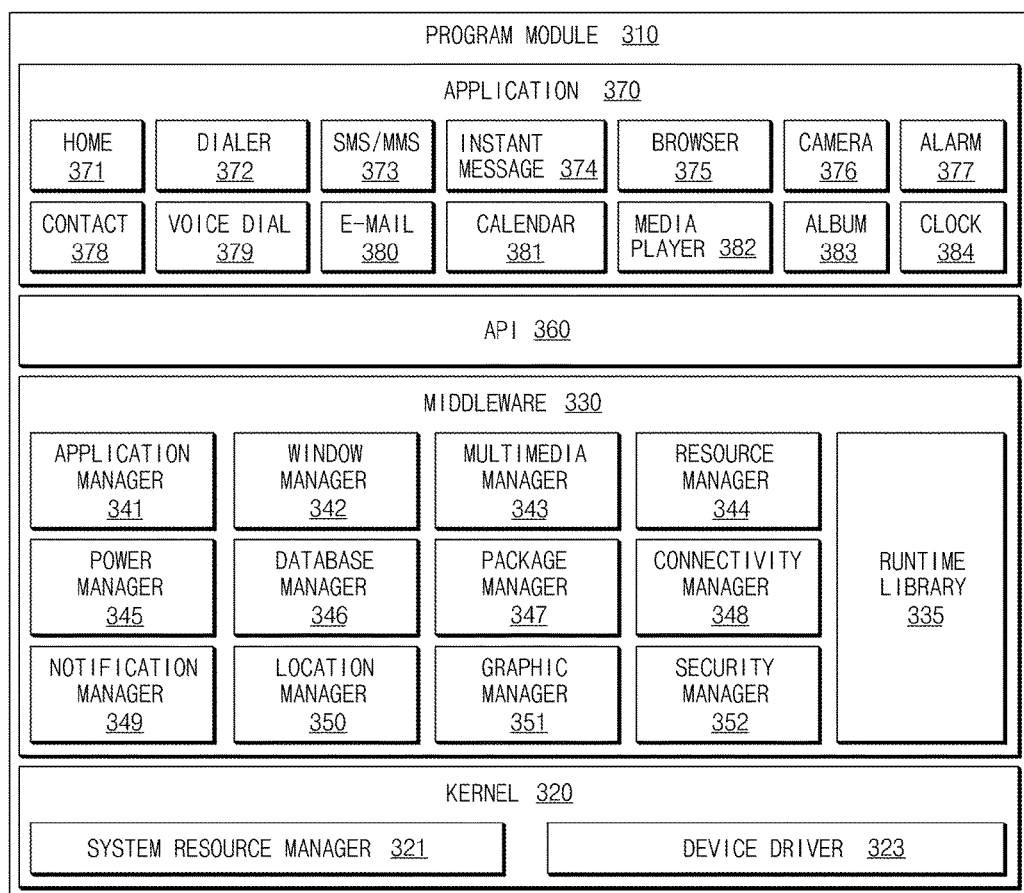
FIG. 3 is a block diagram of a program module according to various embodiments of the present disclosure.

FIG. 3 is a block diagram of a program module according to various embodiments of the present disclosure.

Referring to FIG. 3, a program module 310 (e.g., the program 140) may include an OS to control resources associated with an electronic device (e.g., the electronic device 101), and/or applications (e.g., the application program 147) executed by the OS. The OS may be, for example, Android®, iOS®, Windows®, Symbian®, Tizen®, or Bada®.

The program may include, for example, a kernel 320, a middleware 330, an API 360, and/or an application 370. At least a part of the program module 310 may be preloaded on an electronic device or may be downloadable from another electronic device (e.g., the first external electronic device 102, the second external electronic device 104, and the server 106, or the like).

The kernel 320 (e.g., the kernel 141) may include, for example, a system resource manager 321 and/or a device driver 323. The system resource manager 321 may perform control, allocation, or retrieval of system resources. According to an embodiment, the system resource manager 321 may include a process managing part, a memory managing part, or a file system managing part. The device driver 323 may include, for example, a display driver, a camera driver, a BT driver, a common memory driver, a USB driver, a keypad driver, a Wi-Fi driver, an audio driver, or an inter-process communication (IPC) driver.

The middleware 330 may provide, for example, a function that the application 370 needs or may provide diverse functions to the application 370 through the API 360 to allow the application 370 to efficiently use system resources of the electronic device. According to an embodiment, the middleware 330 (e.g., a middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is being executed. The runtime library 335 may perform input/output management, memory management, or capacities related to arithmetic functions.

The application manager 341 may manage, for example, a life cycle of the application 370. The window manager 342 may manage a graphical user interface (GUI) resource of a screen. The multimedia manager 343 may identify a format necessary for playing media files and may perform encoding or decoding of media files by using a codec suitable for the format. The resource manager 344 may manage resources, such as a storage space, a memory, and a source code of at least one application of the application 370.

The power manager 345 may operate, for example, with a basic input/output system (BIOS) to manage a battery or power and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, a wireless connection such as a Wi-Fi connection or a BT connection. The notification manager 349 may display or notify an event such as an arrival message, a promise, or a proximity notification in a manner that does not disturb a user. The location manager 350 may manage location information of an electronic device. The graphic manager 351 may manage a graphic effect that is provided to a user or manage a user interface (UI) relevant thereto. The security manager 352 may provide a general security function for system security or user authentication. According to an embodiment, when an electronic device (e.g., the electronic device 101) includes a telephony function, the middleware 330 may further includes a telephony manager for managing a voice or video call function of the electronic device.

The middleware 330 may include a middleware module that combines functions of the above-described elements. The middleware 330 may provide a module specialized to each OS to provide differentiated functions. Additionally, the middleware 330 may dynamically remove a part of the preexisting elements, or may add new elements thereto.

The API 360 (e.g., the API 145) may be, for example, a set of programming functions and may be provided with a configuration which is depends on an OS. For example, when the OS is the Android or iOS, it may be permissible to provide one API set. When the OS is the Tizen, it may be permissible to provide two or more API sets.

The application 370 (e.g., the application program 147) may include, for example, one or more applications capable of providing functions for a home 371, a dialer 372, a short message service (SMS)/multimedia message service (MMS) 373, an instant message (IM) 374, a browser 375, a camera 376, an alarm 377, a contact 378, a voice dial 379, an e-mail 380, a calendar 381, a media player 382, an album 383, and a clock 384, health care (e.g., measuring an exercise quantity, blood sugar, or the like), or environment information (e.g., barometric pressure, humidity, temperature, or the like).

According to an embodiment, the application 370 may include an information exchanging application to support information exchange between the electronic device (e.g., the electronic device 101) and other electronic devices (e.g., the first external electronic device 102 and the second external electronic device 104). The information exchanging application may include, for example, a notification relay application for transmitting specific information to the external electronic device or a device management application for managing the external electronic device.

For example, the information exchanging application may transmit notification information from other applications (e.g., applications for SMS/MMS, e-mail, health care, or environmental information) to other electronic devices (e.g., the first external electronic devices 102 and the second external electronic device 104). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of other electronic devices (e.g., the first external electronic device 102 and the second external electronic device 104) which communicates with the electronic device, an application running in the external electronic device, or a service (e.g., a call service, a message service, or the like) provided from the external electronic device.

According to an embodiment, the application 370 may include an application (e.g., a health care application of a mobile medical device, and the like) which is assigned in accordance with an attribute of other electronic devices (e.g., the first external electronic device 102 and the second external electronic device 104). According to an embodiment, the application 370 may include an application that is received from an external electronic device (e.g., the first external electronic device 102, the second external electronic device 104, or the server 106). According to an embodiment, the application 370 may include a preloaded application or a third party application that is downloadable from a server. The elements titles of the program module 310 according to the embodiment may be modifiable depending on the OS.

According to various embodiments, at least a portion of the program module 310 may be implemented by software, firmware, hardware, or a combination of two or more thereof. At least a portion of the program module 310 may be implemented (e.g., executed), for example, by a processor (e.g., the processor 210). At least a portion of the program module 310 may include, for example, modules, programs, routines, sets of instructions, processes, or the like, for performing one or more functions.

Figure 4:
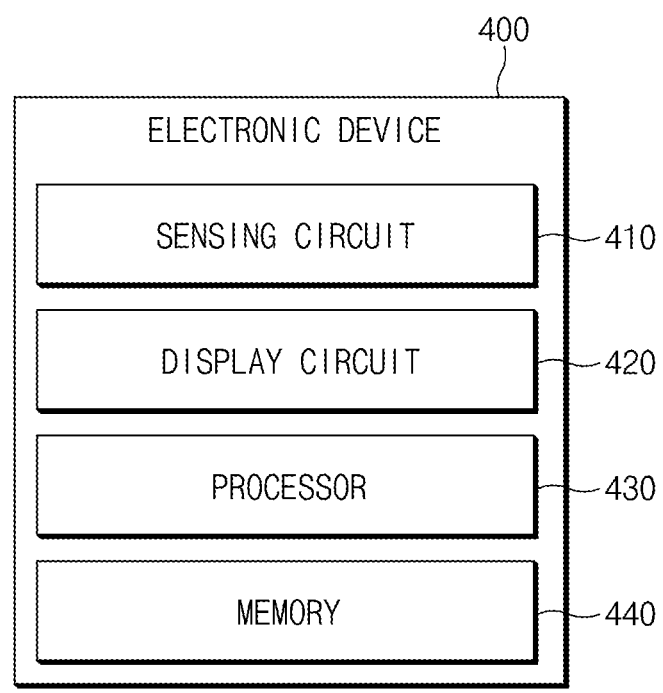
FIG. 4 is a block diagram of an electronic device according to various embodiments of the present disclosure.

FIG. 4 is a block diagram of an electronic device according to various embodiments of the present disclosure.

Referring to FIG. 4, an electronic device 400 may include a sensing circuit 410, a display circuit 420, a processor 430, and a memory 440. A configuration of the electronic device 400 may be variously changed or modified. For example, the electronic device 400 may further include an input device that receives any instruction or information from a user. In this case, the input device may generally be a separate device, such as a keyboard, a mouse, or the like, but may also be provided via a GUI on a display (for example, the display 160) of the electronic device 400.

According to various embodiments of the present disclosure, the sensing circuit 410 may capture an authentication image. The authentication image may be an image that includes unique information of a user and may include an iris image, a cornea image, a fingerprint image, or the like. However, various embodiments of the present disclosure will be described as the authentication image is the iris image.

Furthermore, the sensing circuit 410 may be a sensor that is capable of acquiring an image. Various embodiments of the present disclosure will be described as the sensing circuit 410 is an infrared sensor.

According to various embodiments of the present disclosure, the display circuit 420 may display content. The content may include an image, a video, a home screen, a widget screen, an application execution screen, and the like.

The display circuit 420 may display a preview image related to the authentication image captured by the sensing circuit 410.

Furthermore, the display circuit 420 may display a guide to facilitate acquiring authentication images. For the sensing circuit 410 to capture the authentication image with the quality that is available in the processor 430, the guide may be provided to the user. For example, the guide may be information that directs an authentication target (e.g., an iris) corresponding to the authentication image to be located at a specific distance from the sensing circuit 410 (e.g., the infrared sensor).

The guide may be provided for each authentication image. In the case where the quality of an authentication image is guaranteed, a separate guide may not be provided with respect to the corresponding authentication image. Alternatively, a guide indicating that the current state is appropriate may be provided.

According to various embodiments of the present disclosure, the guide may be provided through a UI, such as voice, sound, vibration, haptic effect, or the like, as well as the GUI that is displayed on the display.

According to various embodiments of the present disclosure, the processor 430 may be implemented with, for example, a SoC and may include one or more of a CPU, a GPU, an ISP, an AP, and a CP. The processor 430 may load an instruction or data, which is received from at least one of other elements (e.g., the sensing circuit 410 and the display circuit 420), from the memory 440, may process the loaded instruction or data, and may store a variety of data in the memory 440.

The processor 430 may acquire the authentication image captured through the sensing circuit 410. The processor 430 may capture a plurality of authentication images through the sensing circuit 410 during a specific time.

The processor 430 may generate a preview image of the authentication image. According to various embodiments of the present disclosure, the processor 430 may generate a preview image about each of a plurality of authentication images. However, the processor 430 may generate a preview image about each of a part of the plurality of authentication images. The generated preview image may be provided to the user through the display circuit 420. The preview image may be generated by extracting a region, which does not include sensitive information, from the authentication image. Alternatively, the preview image may be generated by processing the authentication image such that the sensitive information is not recognized. For example, the processor 430 may generate the preview image by lowering quality of the authentication image or reducing a size of the authentication image. In particular, the preview image may be an image of which the resolution is sufficiently lowered such that the sensitive information is not recognized from the authentication image. Furthermore, the processor 430 may generate the preview image by applying a blur filter to the authentication image to blur the sensitive information, applying a mosaic filter to the sensitive information, or replacing a portion of the authentication image with another image. The sensitive information may include an iris pattern. To protect the preview image when the preview image is leaked to the outside, the processor 430 may generate the preview image processed in the above-described way such that the iris pattern is not recognized.

The processor 430 may determine whether the acquired authentication image is valid for authentication. Whether the authentication image is valid for the authentication may be determined, for example, based on a distance between the sensing circuit 410 and an authentication target corresponding to the authentication image. That is, the processor 430 may determine whether the authentication target is located in an effective area (or distance) of the sensing circuit 410, based on the authentication image.

Whether the distance between the authentication target and the sensing circuit 410 is appropriate may be determined based on a size by which the authentication target occupies the authentication image. Furthermore, the processor 430 may determine whether the authentication image is valid for the authentication, based on visibility of the authentication image. Furthermore, the processor 430 may determine whether the authentication target on the authentication image, for example, the user's iris is captured normally. For example, the determination may be made based on the degree of opening of user's eyes, for example, whether the user closes his/her eyes, whether the user closes his/her eyes half, whether the iris is located in the center of the authentication image, or the like.

When the authentication image is invalid for the authentication, the processor 430 may generate a guide to facilitate capturing an image that is valid for the authentication. Even though the authentication image is invalid for the authentication, the preview image may be generated from the authentication image, and the preview image may be displayed together with the guide. As described above, the guide may be information that directs the authentication target corresponding to the authentication image to be located at a specific distance from the sensing circuit 410. Therefore, the guide may display information such as 'come close', 'step back', 'turn your eyes to the left', 'turn your eyes to the right', 'stay there and don't move, or the like.

The processor 430 may select at least one or more of the plurality of authentication images captured during the specific time and may perform authentication after the specific time elapses.

The processor 430 may select 5 authentication images of 15 authentication images that are captured during a second, for example, at 15 frames per second (fps). The selected authentication images may be images, the quality of each of which is guaranteed, from among the plurality of the authentication images captured during the specific time. Whether the quality is guaranteed may be determined, for example, based on contents of the guide provided with respect to the authentication image.

The selected authentication images may be images that are selected based on a specific time. On the other hand, according to various embodiments of the present disclosure, the number of authentication images to be selected may be determined based on the number of images. For example, in the former, the number of authentication images, which are to be selected as images that are valid for the authentication, from among authentication images captured for a second, for example, the specific time may not be restricted. In the latter, it may take a time of 30 ms, 1 second, 3 seconds, or the like to select the specific number of authentication images, regardless of the time. Alternatively, the processor 430 may select images, of which the number is determined in advance and of which the qualities are higher than or equal to a specific quality, from among the plurality of authentication images. The processor 430 may select authentication images in any one of the above-described ways.

The processor 430 may select one authentication image, which is valid for authentication, from among the selected authentication images. For example, the processor 430 may select one authentication image, on which the iris that has the most appropriate size and is the most visible is displayed, from among the selected authentication images as one authentication image that is valid for the authentication. Furthermore, even though the iris of the appropriate size is displayed, the authentication image in which eyelashes do not cover the iris may be selected.

In this case, the processor 430 may extract personal authentication information from the selected authentication image such as, for example, from the iris. The personal authentication information may be, for example, a template of the iris. In an operation of registering the personal authentication information, the processor 430 may store the extracted personal authentication information in the memory 440. In an operation of performing personal authentication, the processor 430 may perform the authentication by comparing the extracted personal authentication information with the personal authentication information stored in the memory 440.

Data, for example, instructions performed by the processor 430, may be stored in the memory 440. In this case, data stored in the memory 440 may include data exchanged among internal elements of the electronic device 400 and data exchanged between the electronic device 400 and external devices. For example, the memory 440 may store information of the user's iris and the like. Furthermore, the memory 440 may store the selected authentication images. Furthermore, the memory 440 may store the personal authentication information calculated from the information of the user's iris.

The memory 440 may include an embedded (or internal) memory or an external memory. For example, the embedded memory may include at least one of a volatile memory (e.g., a DRAM, a SRAM, or a SDRAM), a nonvolatile memory (e.g., a OTPROM, a PROM, an EPROM, an EEPROM, a mask ROM, a flash ROM, a NAND flash memory, or a NOR flash memory), a hard disk drive (HDD), or a SSD.

The external memory may include a flash drive, for example, CF, SD, micro-SD, mini-SD, xD, MMC, or a memory stick. The external memory may be functionally and/or physically connected to the electronic device 400 through various interfaces.

It may be easily understood that the sensing circuit 410, the display circuit 420, the processor 430, and the memory 440 are implemented independently of each other or two or more thereof are integrated.

Figure 5:
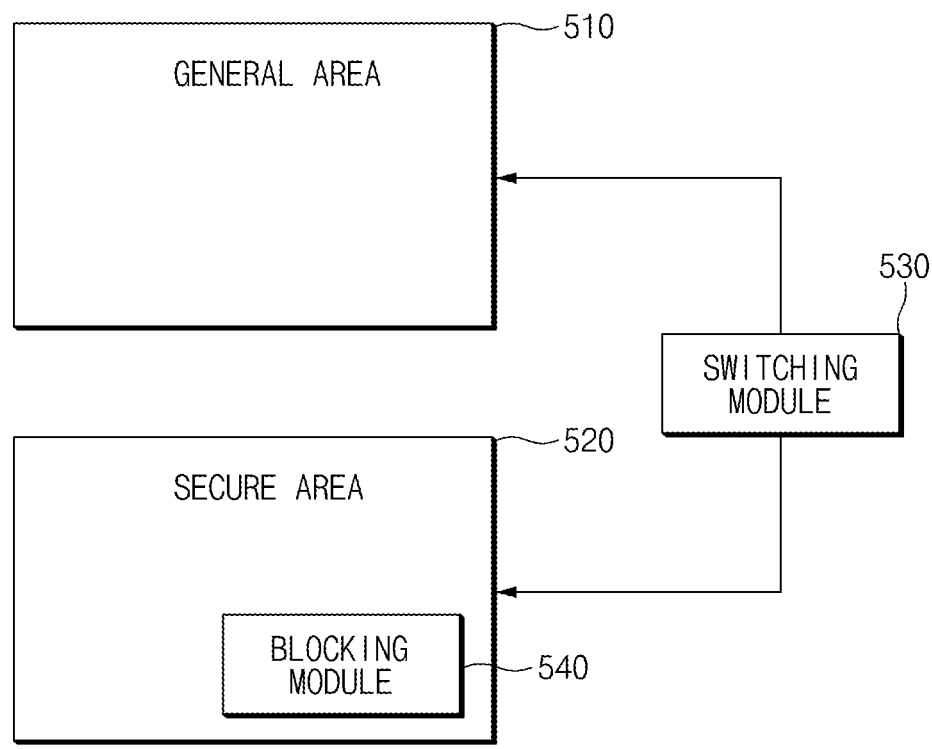
FIG. 5 is a drawing illustrating a working environment of the electronic device according to various embodiments of the present disclosure.

FIG. 5 is a drawing illustrating a working environment of the electronic device according to various embodiments of the present disclosure.

Referring to FIG. 5, a working environment 500 may include a general area 510 and a secure area 520. The general area 510 and the secure area 520 may occupy different areas of the memory 440, respectively.

The processor 430 may perform multitasking in the general area 510, while the processor 430 may perform only a task in the secure area 520. Furthermore, an executable application or the like may be restricted to a specific application in the secure area 520.

For example, the processor 430 may perform an operation of generating a preview image and an operation of generating a guide in the secure area 520. Furthermore, an operation of selecting an authentication image and an operation of performing authentication may be performed in the secure area 520. However, an operation of providing the generated preview image or guide may be performed in the general area 510.

A switching module 530 may select to use a memory space of the general area 510 and the secure area 520. The selection may be determined based on the operation being performed by the processor 430 or an application being currently used.

A blocking module 540 may prevent an application from being executed in the secure area 520, or prevent a function from accessing a memory corresponding to the secure area 520. For example, the blocking module 540 may prevent an authentication image from being read from an application executed in the general area 510.

Figure 6A:
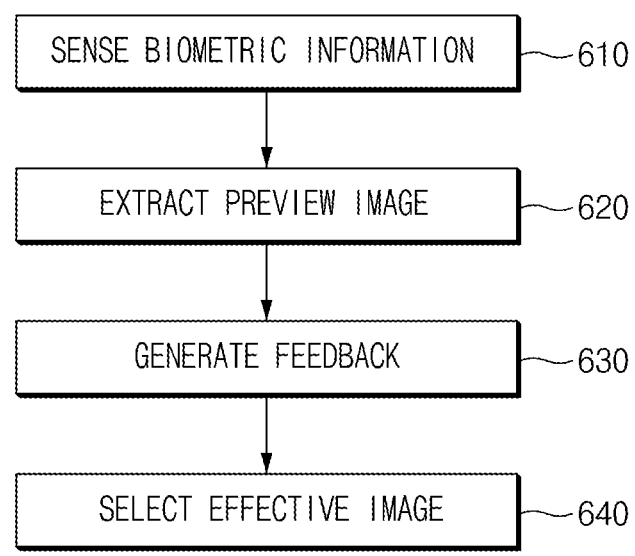
FIG. 6A is a flowchart of a method for selecting an effective image of authentication images acquired by the electronic device according to various embodiments of the present disclosure.

FIG. 6A is a flowchart of a method for selecting an effective image of authentication images acquired by the electronic device according to various embodiments of the present disclosure.

Referring to FIG. 6A, a method for selecting the effective image of the authentication images acquired by the electronic device 400 will be described. Even though omitted below, information about the method for selecting the effective image of the authentication images acquired by the electronic device 400 described with reference to FIGS. 1 to 5 may be applied to FIG. 6A.

In operation 610, the electronic device 400 may sense biometric information of a user by using the sensing circuit 410 and may acquire an authentication image based on the sensed biometric information. For example, the electronic device 400 may acquire an authentication image by capturing the user's iris. In another example, the electronic device 400 may acquire an authentication image by sensing the user's fingerprint.

In operation 620, the electronic device 400 may extract a preview image from the authentication image acquired in operation 610. The preview image may be an image that does not include an iris pattern included in the authentication image. For example, the preview image may be generated by extracting a region, which does not include sensitive information, from the authentication image. Alternatively, the preview image may be generated by processing the authentication image such that the sensitive information is not recognized. For example, the processor 430 may generate the preview image by lowering quality of the authentication image or reducing a size of the authentication image. In particular, the preview image may be an image of which the resolution is sufficiently lowered such that the sensitive information is not recognized from the authentication image. Furthermore, the processor 430 may generate the preview image by blurring the sensitive information, applying a mosaic filter to the sensitive information, or replacing a part of the authentication image with another image. The sensitive information may be information about various objects, which are usable for personal authentication, such as an iris image, a fingerprint image, or the like.

In operation 630, the electronic device 400 may generate a feedback based on the authentication image acquired in operation 610. The feedback may be an above-described guide.

In operation 640, the electronic device 400 may select effective images during a specific time or may select effective images of which the number is determined according to a specific value. The effective images may indicate authentication images that are valid for the authentication.

The order of operations 620 to 640 may not be limited to FIG. 6A. For example, operation 620 may be performed after operation 630 or 640 is performed. Furthermore, operation 620 may be omitted.

FIG. 6B is a diagram illustrating selection of an effective image in the electronic device according to various embodiments of the present disclosure.

Referring to FIG. 6B, in operation 650, the electronic device 400 may capture authentication images, each of which includes an eye and iris of the user, by using an image sensor.

In operation 660, the electronic device 400 may acquire a plurality of authentication images 662, 664, and 666 captured in operation 650.

In operation 670, the electronic device 400 may display a preview image 675 generated from the authentication image 666 that is most recently acquired.

In operation 680, the electronic device 400 may select the authentication images 662 and 666, which are valid for the authentication, from the plurality of authentication images 662, 664, and 666.

Figure 7:
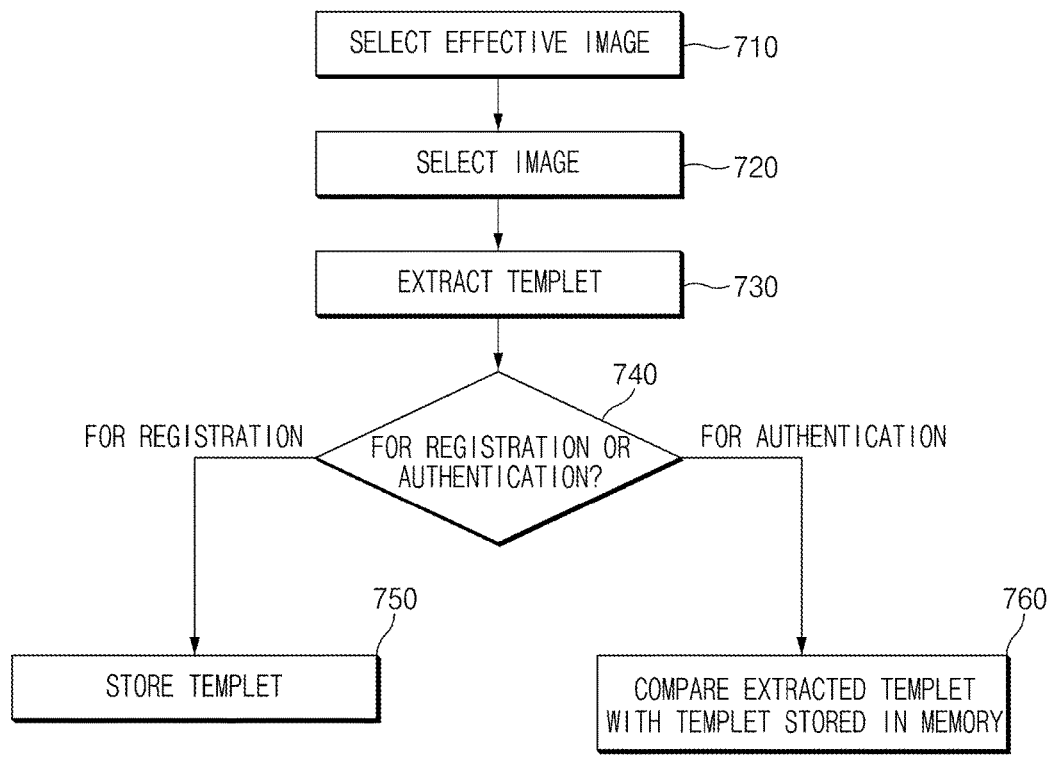
FIG. 7 is a flowchart of a method for selecting an authentication image of effective images according to various embodiments of the present disclosure.

FIG. 7 is a flowchart of a method for selecting an authentication image of effective images according to various embodiments of the present disclosure.

Referring to FIG. 7, a method is illustrated in which the electronic device 400 selects and registers an authentication image of the selected effective images or performs the authentication. Even though omitted below, information about the method in which the electronic device 400 registers the authentication image of the selected effective images or performs the authentication described with reference to FIGS. 1 to 6 may be applied to FIG. 7.

Referring to FIG. 7, in operation 710, the electronic device 400 may select at least one or more effective images. Operation 710 may correspond to operation 640 of FIG. 6A.

In operation 720, the electronic device 400 may select at least one or more authentication images, which are valid for authentication, from among the at least one or more effective images selected in operation 710. At least one or more authentication images, each of which has a value equal to or greater than a specific threshold value, from among a plurality of authentication images acquired by the electronic device 400 may be selected as the at least one or more authentication images. The specific threshold value may be, for example, a reference value about visibility, a size of an iris, or the like.

In operation 730, the electronic device 400 may extract personal authentication information from the at least one or more authentication images selected in operation 720. The personal authentication information may include an iris pattern.

In operation 740, the electronic device 400 may determine whether the personal authentication information extracted in operation 730 is personal authentication information for registration or personal authentication information for authentication. For example, the electronic device 400 may perform operation 740 based on whether a UI for registration is being performed or whether an UI for authentication is being performed. As another example, when currently registered personal authentication information does not exist, the electronic device 400 may provide the UI for registration to the user. In this case, a separate authentication may be required to verify the registered user.

When the personal authentication information extracted in operation 730 is the personal authentication information for registration, the procedure proceeds to operation 750. In operation 750, the electronic device 400 may store the personal authentication information extracted in operation 730 in the memory 440.

When the personal authentication information extracted in operation 730 is the personal authentication information for authentication, the procedure proceeds to operation 760. In operation 760, the electronic device 400 may perform the personal authentication by comparing the personal authentication information extracted in operation 730 with the personal authentication information stored in the memory 440.

Figure 8:
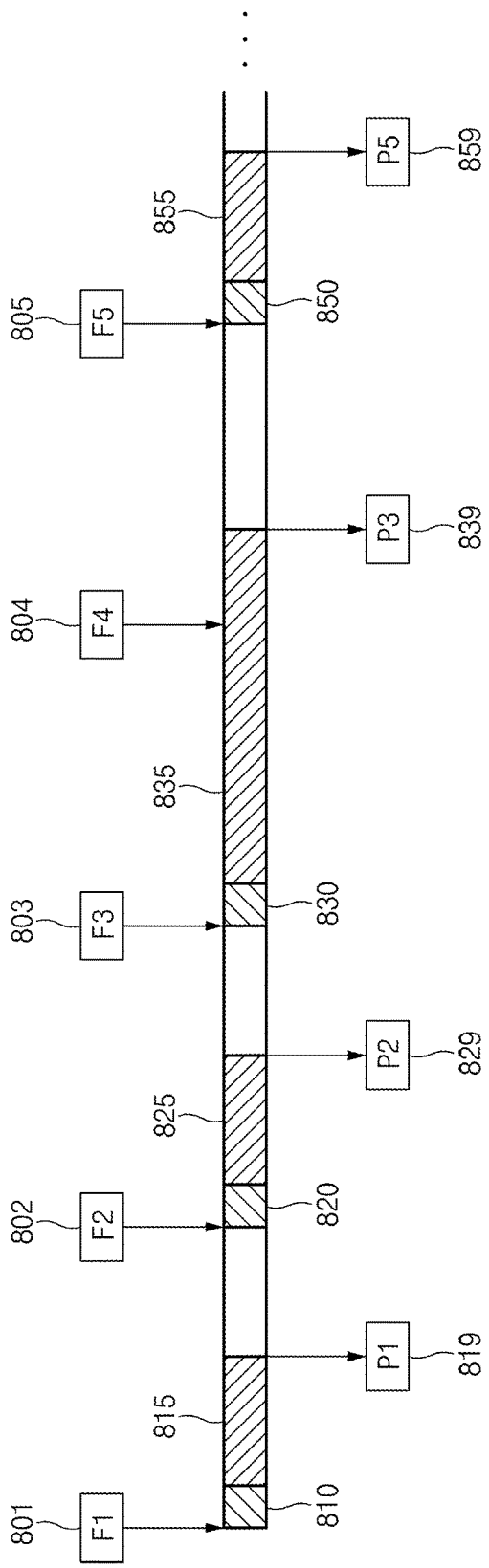
FIG. 8 is a diagram illustrating a method in which an electronic device performs authentication in a secure area according to various embodiments of the present disclosure.

FIG. 8 is a diagram illustrating a method in which an electronic device performs authentication in a secure are.

Referring to FIG. 8, images F1 to F5 801 to 805 indicates 5 frames (authentication images) captured through a sensing circuit, respectively. Hereinafter, images F1 to F5 will be referred to as first to fifth authentication images 801 to 805. Furthermore, images P1 to P5 819, 829, 839, 849, and 859 illustrated in FIG. 8 are preview images generated from the authentication images 801 to 805, respectively.

The electronic device of the related art may perform an operation 810 of generating the preview image 819 about the first authentication image 801 and an operation 815 of performing the authentication in the secure area. In operation 815, the preview image 819 generated in the secure area may be provided to a user in the general area.

The electronic device of the related art may perform the operation, which is performed with respect to the first authentication image 801, with respect to the second authentication image 802 in the same manner in operations 820 and 825.

The electronic device of the related art may generate the preview image 839 about the third authentication image 803 in operation 830 and may perform the authentication in operation 835. However, in the electronic device of the related art, an execution time of operation 835 may become longer due to issues (e.g., performance) of the electronic device of the related art. For example, the security of the secure area of the electronic device of the related art may be maintained by limiting the performance of a processor thereof or by allowing a part of the processor to be used. Therefore, the operation of generating a preview image about the fourth authentication image 804 and of performing the authentication may be omitted.

When the fourth authentication image 804 is acquired, the preview image provided to the user may be the preview image 839. Furthermore, in the case where the fourth authentication image 804 is valid for the authentication and the third authentication image 803 is invalid for the authentication, the user may misjudge the fourth authentication image 804 as being invalid for the authentication. In this case, since the user changes the shooting posture and the electronic device of the related art acquires the fifth authentication image 805 and, in operations 850 and 855, an invalid result may be obtained.

The above-described error may make it difficult to provide an accurate guide to the user and for the user to misjudge an authentication image.

Figure 9:
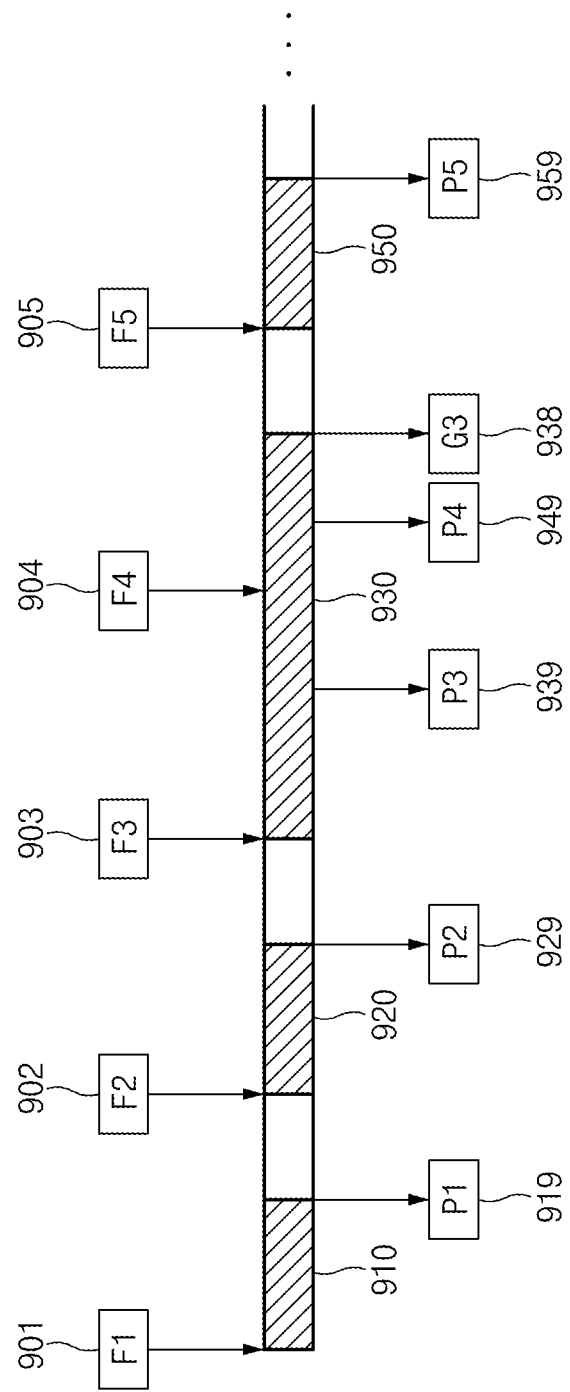
FIG. 9 is a drawing illustrating a method in which the electronic device performs authentication in a general area according to various embodiments of the present disclosure.

FIG. 9 is a drawing illustrating a method in which the electronic device performs authentication in a general area according to various embodiments of the present disclosure.

Referring to FIG. 9, operations may be performed in a general area (e.g., the general area 510 of FIG. 5). Therefore, a plurality of operations (for example, generation of a preview image and guide and execution of the authentication) may be performed.

In particular, images may be input to authenticate a user. In operations 910 and 920, authentication may be performed as described above with reference to FIG. 8. However, in operation 930, in which a third preview image 939 and a guide are generated and the authentication is performed, may be delayed due to the performance issue of the electronic device. In this case, the authentication that is performed in the general area may be substantially similar to the authentication that is performed in the secure area, and the authentication using a fourth authentication image 904 may be omitted.

Furthermore, even though the third preview image 939 of a third authentication image 903 is generated and provided within a specific time, the fourth authentication image 904 is not processed due to the time to perform operation 930. Furthermore, a third guide G3 938 generated with respect to the third authentication image 903 may be displayed after a fourth preview image 949 about the fourth authentication image 904 is provided.

Therefore, the user may feel the same inconvenience as described with reference to FIG. 8. Furthermore, the case illustrated in FIG. 9 may be vulnerable to the information leak since the secure area is not used.

Figure 10:
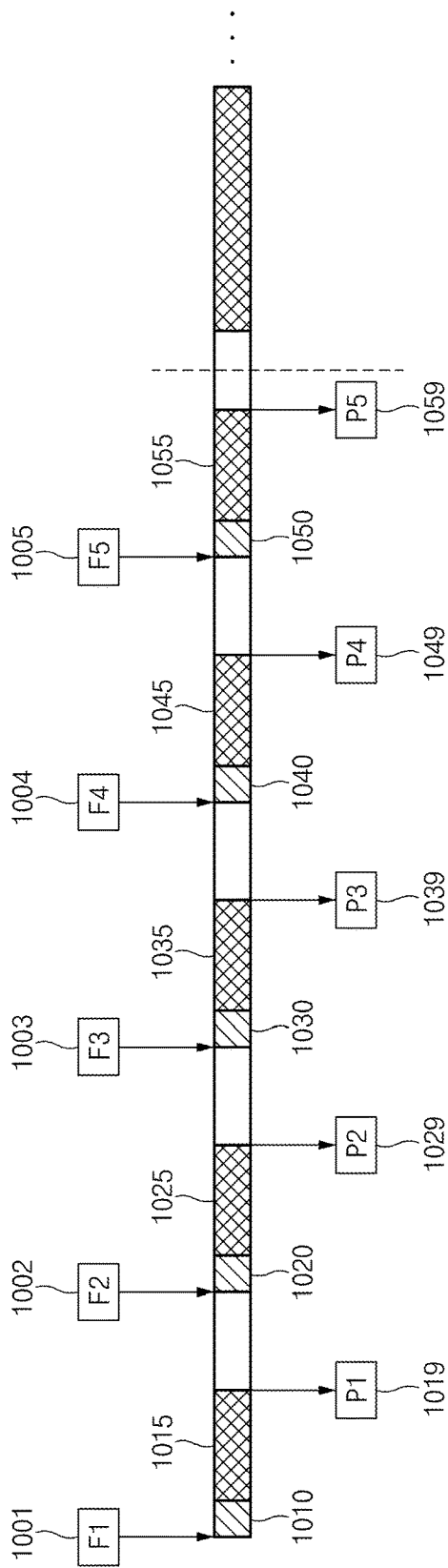
FIG. 10 is a diagram illustrating a method in which an electronic device performs authentication in a secure area according to various embodiments of the present disclosure.

FIG. 10 is a diagram illustrating a method in which an electronic device performs authentication in a secure area according to various embodiments of the present disclosure.

Referring to FIG. 10, images F1 to F5 1001 to 1005 illustrated in FIG. 10 illustrate 5 frames (authentication images) captured through the sensing circuit 410, respectively. Hereinafter, images F1 to F5 will be referred to as first to fifth authentication images 1001 to 1005. Furthermore, images P1 to P5 1019, 1029, 1039, 1049, and 1059 are preview images generated from the authentication images 1001 to 1005, respectively.

Referring to FIG. 10, the electronic device 400 may generate the first preview image 1019 of the first authentication image 1001 in operation 1010 and may generate a guide of the first authentication image 1001 in operation 1015. After the first preview image 1019 is generated in the secure area, the guide may be generated based on the generated first preview image 1019. The guide may be provided together with the first preview image 1019. According to various embodiments, the guide may be generated in the secure area or in the general area. For example, the electronic device 400 may generate a GUI guide in the secure area. The GUI guide may be a guide that is displayed on the display such that the user watches. The GUI guide may be used to inform the degree of opening of the user's eyes and to adjust a distance between eyes and the sensing circuit (e.g., the sensing circuit 410 of FIG. 4). The electronic device 400 may provide the GUI guide generated in the secure area to the general area. In this case, the electronic device 400 may generate a sound guide or a haptic guide corresponding to the GUI guide in the general area and may provide the sound guide or the haptic guide to the user. The sound guide or the haptic guide may be generated based on the GUI guide or may be generated based on the authentication image. Furthermore, in operation 1010, the electronic device 400 may determine whether the first authentication image 1001 is valid. As described in FIG. 4, whether the image is valid may be determined based on whether the user's iris is located in the effective area of the sensing circuit. Furthermore, whether the user's iris is located in the effective area of the sensing circuit may be determined based on a size of the iris in the authentication image.

Unlike FIGS. 8 and 9, the electronic device 400 may not perform the authentication in operation 1015. Furthermore, unlike operation 835 of FIG. 8 or operation 930 of FIG. 9, it may not take a lot of time to perform operation 1015 because the amount of resources needed to perform operation 1015 in which the authentication is not performed is small. Therefore, a time delay may not occur in operations 1015, 1025, 1035, 1045, and 1055.

The electronic device 400 may perform the authentication based on the authentication image that is selected as a valid image in operations 1015, 1025, 1035, 1045, and 1055. For example, the electronic device 400 may select one of selected authentication images. The electronic device 400 may extract personal authentication information from the selected authentication image and may perform the authentication based on the extracted personal authentication information.

An electronic device according to various embodiments of the present invention disclosure includes a sensing circuit and a processor electrically connected with the sensing circuit. The processor captures a plurality of authentication images through the sensing circuit during a specific time, selects at least one or more of the plurality of authentication images, and performs an authentication based on the selected at least one or more authentication images.

According to various embodiments of the present disclosure, the sensing circuit may include an infrared sensor, and the authentication image may be an image that is generated by capturing an iris of a user.

According to various embodiments of the present disclosure, the operation that the processor performs authentication may be an operation of selecting an image from among the one or more selected images and performing the authentication based on the selected image.

According to various embodiments of the present disclosure, the operation that the processor performs authentication may be performed after the specific time elapses.

According to various embodiments of the present disclosure, the electronic device may further include a display circuit electrically connected with the processor. The processor may generate a preview image from each of the plurality of authentication images and provide the generated preview image of each of the plurality of authentication images through the display circuit.

According to various embodiments of the present disclosure, the preview image may be generated by extracting a region, which does not include sensitive information, from the authentication image.

According to various embodiments of the present disclosure, the processor may determine whether an authentication target corresponding to the authentication image is located in an effective area of the sensing circuit.

According to various embodiments of the present disclosure, the at least one or more selected authentication images may be images that are captured in the case where the authentication target is located in an effective area of the sensing circuit.

According to various embodiments of the present disclosure, whether the authentication image is valid may be determined based on a visibility of the authentication image or a size by which an authentication target corresponding to the authentication image occupies the authentication image.

According to various embodiments of the present disclosure, the electronic device may further include a display circuit electrically connected with the processor. When the authentication image is invalid for the authentication, the processor may generate a guide such that an image valid for the authentication is captured and provide the generated guide through the display circuit.

According to various embodiments of the present disclosure, the electronic device may further include a memory electrically connected with the processor. The processor may extract personal authentication information from the selected authentication image and perform the authentication by comparing the extracted personal authentication information with personal authentication information stored in the memory.

According to various embodiments of the present disclosure, an operation of generating the preview image may be performed in a secure area.

According to various embodiments of the present disclosure, an operation of generating the guide may be performed in a secure area.

According to various embodiments of the present disclosure, a method performed on an electronic device includes capturing a plurality of authentication images through a sensing circuit during a specific time and selecting at least one or more of the plurality of authentication images and performing an authentication based on the selected at least one or more authentication images.

According to various embodiments of the present disclosure, the performing of the authentication may include selecting an authentication image of the selected at least one or more authentication images and performing the authentication based on the selected authentication image.

According to various embodiments of the present disclosure, the performing of the authentication may be performed after the specific time elapses.

According to various embodiments of the present disclosure, the performing of the authentication may include extracting personal authentication information from the selected authentication image and comparing the extracted personal authentication information with personal authentication information stored in a memory.

According to various embodiments of the present disclosure, in the case where the captured authentication image is invalid for the authentication, the method may further include generating a guide such that an image valid for the authentication is captured and providing the generated guide through a display circuit.

According to various embodiments of the present disclosure, the method may further include generating a preview image from each of the plurality of authentication images and providing the generated preview image of each of the plurality of authentication images through a display circuit.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments may be, for example, implemented by instructions stored in a computer-readable storage media in the form of a program module. The instruction, when executed by one or more processors (e.g., the processor 120), may cause the one or more processors to perform a function corresponding to the instruction. The computer-readable storage media, for example, may be the memory 130.

The instruction according to various embodiments of the present disclosure may be configured to include an operation that captures a plurality of authentication images through the sensing circuit during a specific time and an operation that performs the authentication by selecting at least one or more authentication images from among the plurality of authentication images.

A computer-readable recording medium may include a hard disk, a magnetic media, a floppy disk, a magnetic media (e.g., a magnetic tape), an optical media (e.g., a compact disc-ROM (CD-ROM) and a DVD, a magneto-optical media (e.g., a floptical disk), and hardware devices (e.g., a ROM, a RAM, or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

According to various embodiments of the present disclosure, the electronic device and the method thereof may perform the personal authentication with a plurality of authentication images captured during a specific time instead of performing the personal authentication with each frame of each authentication image. Accordingly, various embodiments of the present disclosure may separate operations of generating the preview image and guide from the authentication image and providing the preview image and guide from an operation of performing the personal authentication, thereby reducing the user inconvenience due to dropping of the frame of the authentication image.

A module or a program module according to various embodiments may include at least one of the above elements, or a portion of the above elements may be omitted, or additional other elements may be further included. Operations performed by a module, a program module, or other elements according to various embodiments may be executed sequentially, in parallel, repeatedly, or in a heuristic method. Also, a portion of operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a display;
    a sensing circuit; and
    a processor configured to:
    capture a plurality of authentication images through the sensing circuit during a specific time,
    generate a plurality of preview images, wherein each of the plurality of preview images corresponds to a low resolution image of each of the plurality of authentication images,
    generate a guide that directs an authentication target, in association with the at least one of the plurality of authentication images, to be in a location for capturing a valid image for an authentication,
    control the display to output the at least one of the plurality of preview images and the guide, wherein the at least one of the plurality of preview images and the guide are used by a user to align the authentication target with the sensing circuit,
    select at least one first image from the plurality of authentication images based on validity of the plurality of authentication images, wherein a number of images of the selected at least one first image is less than a number of images of the plurality of authentication images,
    perform the authentication based on a biometric information in the selected at least one first image, and
    apply an image filter to at least one of the plurality of preview images such that sensitive information in the at least one of the plurality of preview images is not recognized,
    wherein a resolution of the at least one first image is higher than a resolution of the at least one of the plurality of preview images.

2. The electronic device of claim 1,
    wherein the sensing circuit comprises at least one of an infrared sensor, an image sensor, or an ultrasonic sensor, and wherein each of the plurality of authentication images comprises at least one of an iris, a fingerprint, or a blood vessel of a user.

3. The electronic device of claim 2, wherein the processor is further configured to, if the plurality of authentication images comprise the iris of the user, select the at least one first image based on at least one of a size of the iris, a size of an eye, a visibility, or a degree of opening of the eye in each of the plurality of authentication images.

4. The electronic device of claim 2, wherein the processor is further configured to, if the plurality of authentication images comprise the fingerprint of the user, select the at least one first image based on at least one of a location, a depth, or a visibility of the fingerprint included in each of the plurality of authentication images.

5. The electronic device of claim 2, wherein the processor is further configured to, if the plurality of authentication images comprise the blood vessel of the user, select the at least one first image based on at least one of a location, a thickness, or a visibility of the blood vessel included in each of the plurality of authentication images.

6. The electronic device of claim 1, wherein the processor is further configured to select a second image from the at least one first image and perform the authentication based on the second image.

7. The electronic device of claim 1, wherein the processor is further configured to perform the authentication after the specific time elapses.

8. The electronic device of claim 1,
wherein the image filter reduces a resolution of the at least one of the plurality of authentication images or adds an effect to the at least one of the plurality of authentication images.

9. The electronic device of claim 1, wherein the processor is further configured to:
determine whether each of the plurality of authentication images is valid for the authentication, and
select the at least one first image, which is valid for the authentication, from the plurality of authentication images.

10. The electronic device of claim 9, wherein the processor is further configured to determine whether each of the plurality of authentication images is valid for the authentication based on whether the authentication target corresponding to the plurality of authentication images is located in an effective distance of the sensing circuit.

11. The electronic device of claim 9, wherein the processor is further configured to determine whether each of the plurality of authentication images is valid for the authentication based on at least one of a visibility of each of the plurality of authentication images or a size by which an authentication target corresponding to each of the plurality of authentication images occupies each of the plurality of authentication images.

12. The electronic device of claim 6, further comprising a memory,
wherein the processor is further configured to:
extract personal authentication information from the second image, and
compare the personal authentication information with personal authentication information stored in the memory to perform the authentication.

13. The electronic device of claim 1,
wherein the generation of the preview image is performed in a secure memory space.

14. The electronic device of claim 13,
wherein the preview image generated in the secure memory space is transmitted to a general memory space, and
wherein the preview image is output through the display.

15. The electronic device of claim 1, wherein the generation of the guide is performed in a secure memory space.

16. A method performed on an electronic device, the method comprising;
capturing, by at least one processor, a plurality of authentication images through a sensing circuit during a specific time;
generating, by the at least one processor, a plurality of preview images, wherein each of the plurality of preview images corresponds to a low resolution image of each of each of the plurality of authentication images;
generating, by the at least one processor, a guide that directs an authentication target, in association with each of the plurality of authentication images, to be in a location for capturing a valid image for an authentication;
controlling, by the at least one processor, a display to output the at least one of the plurality of preview images and the guide, wherein the least one of the plurality of preview images and the guide are used by a user to align the authentication target with the sensing circuit;
selecting, by the at least one processor, at least one first image from the captured plurality of authentication images based on validity of the plurality of authentication images, wherein a number of images of the selected at least one first image is less than a number of images of the captured plurality of authentication images;
performing, by the at least one processor, the authentication based on a biometric information in the selected at least one first image; and
applying, by the at least one processor, an image filter to at least one of the plurality of preview images such that sensitive information in the at least one of the preview images is not recognized,
wherein a resolution of the at least one first image is higher than a resolution of the at least one of the plurality of preview images.

17. The method of claim 16, wherein the performing of the authentication comprises:
selecting a second image from the at least one first image;
extracting the biometric information from the second image; and
comparing the biometric information with personal authentication information stored in a memory.

18. A computer-readable recording medium recorded with an instruction, wherein the instruction, when executed by at least one processor, causes the at least one processor to perform a method comprising:
capturing a plurality of authentication images through a sensing circuit during a specific time;
generating a plurality of preview images, wherein each of the plurality of preview images corresponds to a low resolution image of each of the plurality of authentication images;
generating a guide that directs an authentication target, in association with the at least one of the plurality of authentication images, to be in a location for capturing a valid image for an authentication;
controlling a display to output the at least one of the plurality of preview images and the guide, wherein the at least one of the plurality of preview images and the guide are used by a user to align the authentication target with the sensing circuit;

selecting at least one first image from the plurality of authentication images based on validity of the plurality of authentication images, wherein a number of images of the selected at least one first image is less than a number of images of the plurality of authentication images;

performing the authentication based on a biometric information in the selected at least one first image; and applying, by the at least one processor, an image filter to at least one of the plurality of preview images such that sensitive information in the at least one of the preview images is not recognized, wherein a resolution of the at least one first image is higher than a resolution of the at least one of the plurality of preview images.

* * * * *